United States Patent [19]
Pedersen

[11] 3,757,179
[45] Sept. 4, 1973

[54] VOLTAGE CONTROL OF AN A.C. DRIVE SYSTEM DURING MOTOR STARTING

[75] Inventor: Niels Peder Pedersen, Erie, Pa.
[73] Assignee: General Electric Company, Erie, Pa.
[22] Filed: Oct. 24, 1972
[21] Appl. No.: 299,756

[52] U.S. Cl. .................. 318/85, 318/71, 318/101
[51] Int. Cl. ............................................. H02p 5/46
[58] Field of Search ............... 318/66, 71, 85, 101, 318/102, 103

[56] References Cited
UNITED STATES PATENTS
| | | | |
|---|---|---|---|
| 3,205,420 | 9/1965 | Cobb | 318/102 X |
| 3,551,775 | 12/1970 | Safiuddin | 318/71 X |
| 3,663,875 | 5/1972 | Ashiya | 318/71 X |

Primary Examiner—B. Dobeck
Attorney—Harold H. Green, Jr. et al.

[57] ABSTRACT

Method and apparatus for providing rapid synchronization of one or more synchronous motors being started in a system in which a source of adjustable voltage a-c electric power such as an inverter supplies electric power to the motors being started and to a plurality of previously operating motors. A selected output parameter of the source which changes substantially from its steady state level during the starting of one or more motors is monitored, and the output voltage of the source is increased for a predetermined period following the sensing of a change in the output parameter which is consistent with the starting of one or more motors, the increased output voltage implementing rapid synchronization of the motors being started without changing the operating speed of the previously operating motors.

17 Claims, 4 Drawing Figures

VOLTAGE CONTROL OF AN A.C. DRIVE SYSTEM DURING MOTOR STARTING

BACKGROUND OF THE INVENTION

1. Field of the Invention

This invention relates to a-c drive systems of the type in which a plurality of synchronous motors are supplied with electric power from a single source and, more particularly, to the control of such drives in a manner such that one or more motors may be rapidly synchronized without changing the speed of previously synchronized motors.

2. Description of the Prior Art

It is often desirable that the motor of an electric drive system operate at a precisely determined speed continuously without speed fluxuations. This is particularly true in case of certain process applications of drive systems. In addition, it is sometimes desirable that motors not only operate with extreme speed accuracy, but also that a number of motors be supplied with electric power from a single source. By utilizing motors of the synchronous type, such as synchronous-reluctance motors, an entire bank of motors can be made to operate at either identical speeds or at speeds related to each other in known ratios. By utilizing an adjustable frequency, adjustable voltage source such as an inverter or cycloconverter, the operating speeds of synchronous motors can be adjusted to provide the precise operating speeds required by the drive application. Where this type of power source is used, heating of the motors during operation can become a significant problem due to harmonic content in the electric power supplied to the motors. This heating can be somewhat alleviated by maintaining the output voltage of the source at the lowest level consistent with operation of the motors.

In drive systems including a plurality of synchronous motors, it is sometimes desirable to be able to start and stop the motors independently of each other. It is particularly desirable to be able to stop and restart one or more motors while the remaining motors continue to operate at their synchronous speeds. Where, however, motor heating has occurred prior to a stop, it may be difficult or even impossible to restart the motor while it is still hot due to the reduced torque generated by a hot motor. One apparent way to approach this problem would be to permanently increase the normal output voltage of the source so as to produce the necessary torque for starting purposes. This approach is not, however, entirely satisfactory in that the result would be still more heating in all motors and, consequently, a requirement for a still higher voltage. In the past, it has been suggested that the output voltage be increased only for the period of time required for starting and synchronizing the motors and that the output voltage thereafter be returned to a lower steady state level. In this way, a hot motor can be reliably started without subjecting all of the motors to excessive steady state heating. This approach has heretofore been implemented by providing an interlock with the starting means for each motor or each group of motors, the interlock operating through the control apparatus of the source to increase the output voltage for a predetermined period. In drive systems incorporating a relatively small number of motors, this approach is generally satisfactory. However, this approach has been found not to be entirely satisfactory for drive systems having a large number of independently operable motors, e.g., synthetic fiber process applications in which 64 motors are typically connected to a single inverter. In such a case, as many as 64 interlocks and control connections could be required, thus introducing substantial expense and complexity into the system.

SUMMARY OF THE INVENTION

Accordingly, it is a primary object of this invention to provide improved means for assuring rapid and reliable starting of synchronous motors in a drive system in which the motors being started and a number of previously synchronized motors are connected to a source of adjustable voltage a-c electric power.

Another object of this invention is to assure rapid and reliable restarting and resynchronization of motors in a drive system in which the motors being started and previously synchronized motors are connected to a source of adjustable frequency, adjustable voltage electric power.

Yet another object of this invention is to provide the foregoing objects without changing the operating speeds of the previously synchronized motors.

Still another object is to provide the foregoing objects without requiring the use of expensive and complex control circuitry including, wihout being limited to, interlocks associated with the motors adapted for independent starting and stopping.

Briefly stated, in carrying out the invention in one form, an a-c drive system including a source of adjustable voltage a-c electric power and a plurality of synchronous motors coupled to the source for receiving electric power therefrom is provided with control means for facilitating rapid and reliable starting of one or more of the motors. The control means includes first means coupled to the electric power source for sensing an output parameter thereof which varies substantially from its steady state level during the starting of one or more motors, the first means producing a first signal having a magnitude representative of the selected output parameter. The first control signal is supplied to second means which produces a second control signal in response to a substantial change in the first control signal, the second control signal being supplied in turn to third means for producing in response to a second control signal a third control signal having a predetermined duration following the initial reception of the second control signal. The third control signal is supplied to fourth means for increasing the output voltage of the a-c electric power source throughout the predetermined duration of the third control signal. The increased voltage permits rapid starting and synchronization of the motors being started, but the limited duration of the voltage increase limits the heating effect of the voltage increase on the motors.

By a further aspect of the invention, the output parameter sensed by the first means is the component of output current that is in phase with the output voltage of the source. By a still further aspect of the invention, the frequency of the a-c source, which may be an inverter, cycloconverter, or other static power converter, is not changed in response to the third control signal. In this manner, the motors operating and synchronized prior to the starting process continue to operate at their synchronous speeds without any adverse speed fluxuations. By still further aspects of the invention, the second means is responsive to only increases in the first control signal and the third means is responsive to second control signals to produce third control signals having substantially constant magnitudes throughout the predetermined duration and magnitudes established independently of the magnitude of the second control signals.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
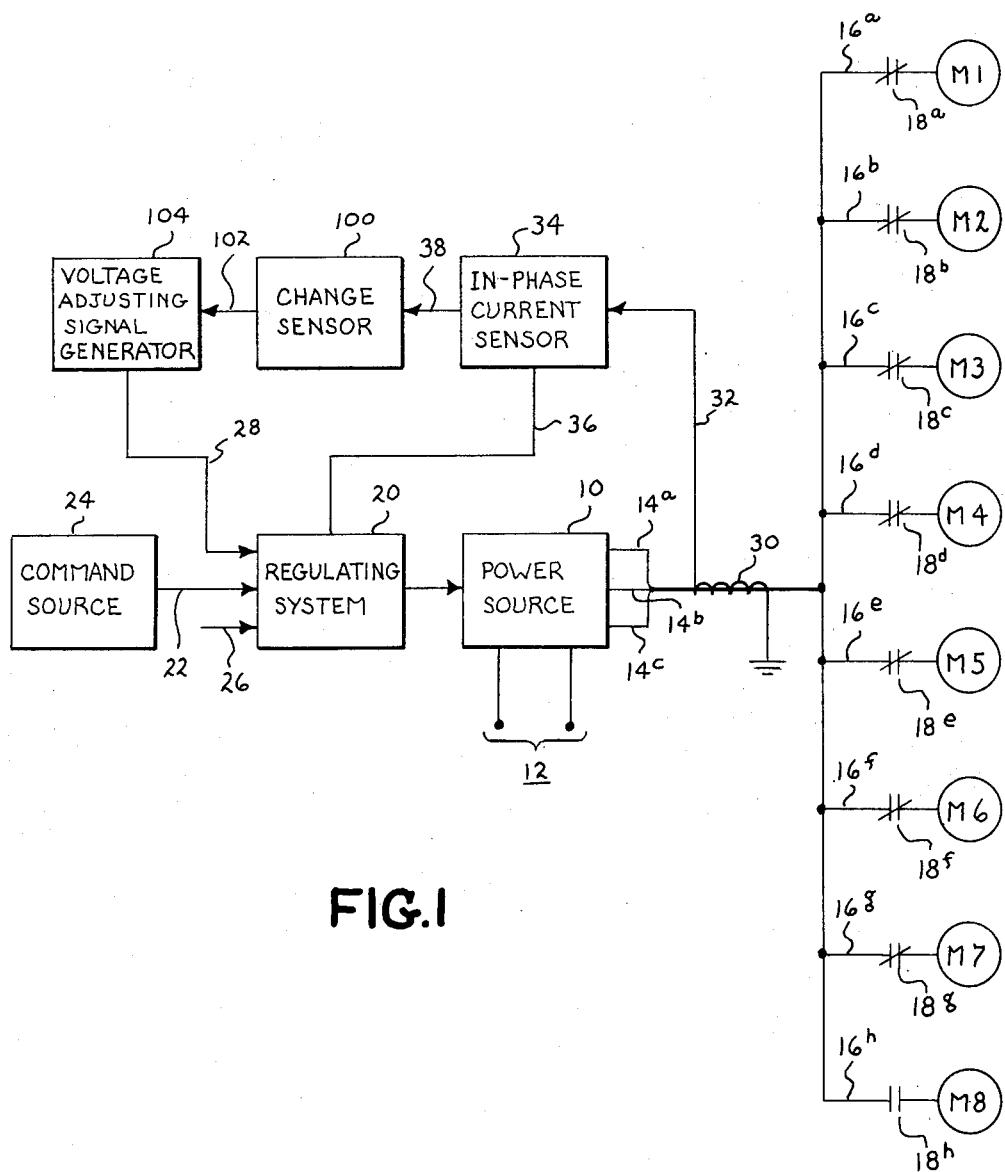
FIG. 1 is a block diagram of an a-c drive system including incorporating the invention.

A drive system incorporating the present invention is illustrated by FIG. 1, the drive system including a source 10 of adjustable voltage electric power. The power source 10 is preferably a static inverter for converting electric power from a d-c source 12 to 3-phase adjustable frequency, adjustable voltage electric power on output phase conductors 14A, 14B and 14C. The source 10 may, however, take on other forms such as a cycloconverter for converting a-c electric power to adjustable frequency, adjustable voltage electric power. The source 10 may supply single phase rather than 3-phase electric power.

The output conductors 14A, 14B and 14C are connected through individual 3-phase conductors 16A through 16H (shown in single line form) and respective individually operative starting and stopping contacts 18A through 18H to a respective plurality of 3-phase synchronous motors M1 through M8. While only eight motors are illustrated, it is typical for a single source 10 to supply even greater numbers of motors. For example, in the synthetic fiber industry, a single power source often supplies as many as 64 motors which are capable of being individually started and stopped. Thus, the eight motors M1 through M8 are merely representative of a plurality of motors coupled to a single source.

Let it now be assumed that the drive system is operating with contacts 18A through 18G closed as illustrated such that motors M1 through M7 are operating at their synchronous speeds. Let it also be assumed that a regulating system 20 is controlling the output frequency of the source or inverter 10 such that the synchronous speeds of the motors M1 through M7 are established in accordance with the magnitudes of a command signal 22 from a command source 24 and appropriate feedback signals 26 forming no part of the present invention. The output voltage of the inverter 10 is also controlled by the regulating system 20 in response to the signals 22 and 26 and, under starting conditions, by a signal 28 generated in accordance with this invention.

If the contacts 18H are now closed, electric power at the output frequency and voltage of the inverter 10 will be applied to the motor M8 to start the motor M8. During starting, it has been found that the output current of the source 10 rises very substantially as the result of the starting of just one motor in a bank of motors in which a number of motors are already running. For example, in a typical drive system in which 63 motors are operating synchronously, it has been found that the starting of the 64th motor will momentarily increase the output current from a steady state 189 amperes to 210 amperes. Thus, the closing of the contacts 18H to start the motor M8 will cause a very significant rise in the inverter output current on conductors 14. Similarly, the closing of one of the contacts 18A through 18G to start the respective one of the motors M1 through M7 while a number of the other motors are operating will result in a similar momentary increase in output current.

In accordance with the present invention, the output current of the inverter 10 is monitored, and means are provided which are responsive to an increase in current consistent with the start of a motor to produce the voltage increasing signal 28. The signal 28 and the resulting increases in inverter output voltage and motor torque persist for a period of time sufficient to bring the motor being started up to its synchronous speed. The signal 28 is then automatically removed, and the output voltage drops to a steady state level sufficient for motor operation with minimum heating.

Still referring to FIG. 1, the output current of each phase of the inverter 10 is sensed by means of current transformers (represented by numeral 30 of FIG. 1) from which signals proportional to the actual currents in the conductors 14A, 14B and 14C are supplied over lines 32 to an in-phase current sensor 34. Over lines 36, the in-phase current sensor 34 is supplied from the regulating system 20 with signals in-phase with the output voltage of the inverter 10, the in-phase current sensor 34 producing signal 38 proportional to the component of the output current that is in phase with the output voltage. With all or a significant number of the motors M1–M8 running under steady state conditions, the in-phase current signal 38 will have a substantially fixed level. During subsequent start-up of one or more motors, the in-phase signal 38 will increase substantially. It has been found that the in-phase current component is an extremely responsive indicator of a motor start. Other output parameters of the inverter which change substantially with the starting of a motor can, of course, be used as an indication of motor starting. For example, the actual current as well as its in-phase component is a highly satisfactory output parameter for indicating the starting of a motor.

Figure 2:
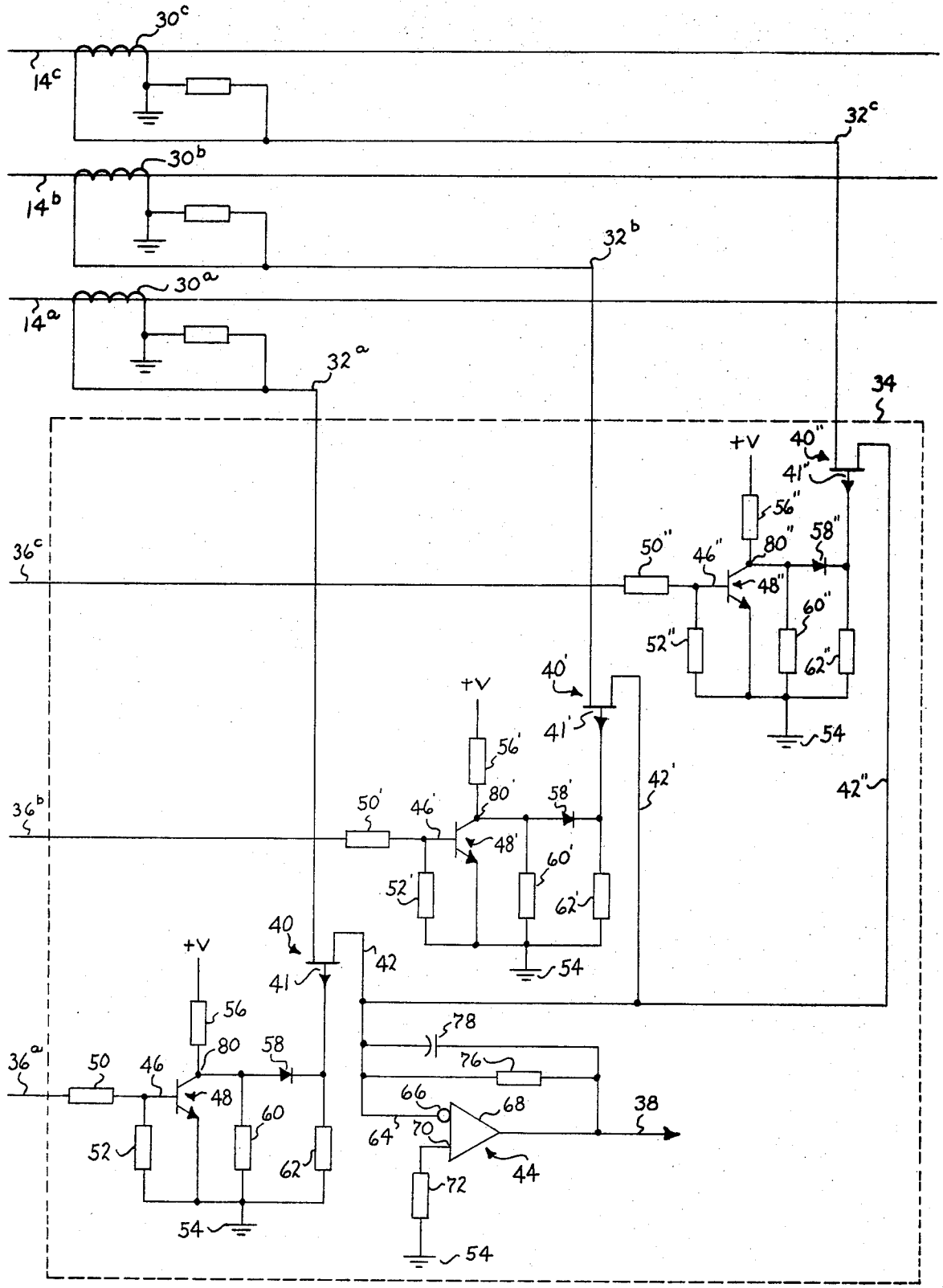
FIG. 2 is a circuit diagram of a preferred embodiment of the output parameter sensor of FIG. 1, the illustrated embodiment comprising an in-phase current sensor suitable for use in a three phase drive system.

Referring now to FIGS. 1 and 2, the in-phase current sensing apparatus will be described in greater detail. Current signals proportional to the actual phase currents in conductors 14A, 14B and 14C are generated, respectively, by current transformers 30A, 30B and 30C and are supplied over conductors 32A, 32B and 32C to the in-phase current sensor 34. The conductor 32A supplies the signal proportional to the actual phase current in conductor 14A to a field effect transistor (FET) 40 at either its source or drain electrode. Since the field effect transistor 40 is bi-directional with respect to its current path through the source-drain electrodes, the conductor 32A may be connected to either of the two, and a conductor 42 to a summing amplifier 44 is connected to the other electrode. The conductor 36A supplies a rectangular or square wave voltage signal in phase with the voltage applied to conductor 14A by the power source 10. As shown by FIG. 2, the voltage signal on conductor 36A is coupled to the base electrode 46 of a conventional NPN type transistor 48 by a resistor 50. A resistor 52 is connected to the gate electrode 46 of the transistor 48 as well as to a ground or common point 54 to stabilize the voltage level of the gate electrode when no voltage signal is present on the conductor 36A. The collector electrode of the transistor 48 is coupled through a resistor 56 to a positive bias voltage and through a diode rectifier 58 to the gate of FET 40 and through yet another resistor 60 to the ground or common point 54. The gate of the FET 40 is also connected through a resistor 62 to the common point 54. The conductors 32B and 32C supply signals proportional to the actual phase currents in conductors 14B and 14C to similar circuits in which similar elements are identified by primed and double primed reference numerals, and square wave signals in phase with the output voltages of conductors 14B and 14C are supplied on conductors 36B and 36C, respectively. Conductors 42' and 42'' are also connected to the summing amplifiers 44.

FIG. 2 also shows the summing amplifier 44 in detail. An input lead 64 to the summing amplifier 44 serves to sum the phase current signals on conductors 42, 42' and 42'' and to introduce the summation thereof into an inverting input 66 of an operational amplifier 68. A non-inverting input 70 of the amplifier 44 is coupled by a resistor 72 to ground or common point 54. In parallel with the amplifier 44 between the input lead 64 thereto and its output conductor 38' are a gain-setting resistor 76 and a filter capacitor 78.

The operation of the in-phase current sensing apparatus 34 will now be described. As previously explained, an electrical signal continuously proportional to the actual current in conductor 14A is supplied to the FET 40 by conductor 32A, and a square wave electrical signal in phase with the voltage applied to conductor 14A is supplied on conductor 36A from the regulating system 20. As long as the transistor 48 is turned off, the positive voltage applied to the resistor 56 is sufficient to maintain the FET 40 in a non-conductive state by applying a positive voltage to its base 40'. As long as the FET 40 is non-conductive, there will be an absence of a signal on conductor 42 to the summing amplifier 44.

When, however, the voltage signal applied on conductor 36A changes from the relatively negative half-cycle to its relatively positive half-cycle, the positive voltage at the base 46 will be sufficient to turn on the transistor 48, thereby causing the voltage at junction 80 to drop to approximately that of common point 54. As a result, the voltage at the base 40' of the FET 40 drops sufficiently to turn on the FET 40, and the current signal supplied on conductor 32A is passed to the conductor 42 and the summing amplifier 44 by the FET 40. The FET 40 will remain conductive so long as the voltage signal supplied on conductor 36A is relatively positive. When it drops to its relatively negative level at the end of the positive half-cycle, the transistor 48 will immediately turn off and thereby turn off the FET 40. It will thus be appreciated that the actual current signal on conductor 32A is conducted to the summing amplifier 44 during the full positive half-cycles of the voltage signal, but not during the negative half-cycle.

Since the motors M1-M8 are inductive loads, the actual current in phase A will not be in phase with the voltage of phase A. Accordingly, the signal supplied to conductor 42 by the bi-directional FET 40 during the positive half-cycle of voltage will be negative for a portion of the conductive time and positive during a portion of the conductive time. At a given instant, the phase control signal to conductor 42, whether it is negative or positive, will be proportional to the actual current in phase A at that instant. Over the entire positive half-cycle of voltage, the phase control signal will have an average magnitude proportional to the average magnitude of the component of actual phase current which is in phase with the voltage. As long as the actual phase voltage and current are symmetrical and attain equal positive and negative levels, the average magnitude of the phase control signal over a full cycle will be proportional to the average magnitude of the in-phase component of actual current.

The circuits connected to input conductors 32B and 36B and to input conductors 32C and 36C operate in a similar manner to produce on conductors 42' and 42'' electrical control signals proportional to the in-phase components of current in conductors 14A and 14B. These signals are summed at conductor 64 and are thus supplied to the inverting amplifier 68 of the summing amplifier 44 as an electrical signal proportional to the average of the three in-phase components of actual current. Since at least one phase will have positive voltage at all times, the signal supplied to the amplifier 68 will be continuous even though signals will be present on any one of the conductors 42, 42' and 42'' only half of the time.

As indicated previously, the amplifier 68 inverts and amplifies the signal on conductor 64 to generate a control signal on conductor 38', the control signal being proportional to the average of the in-phase components of current in phases A, B and C. The control signal is identified in FIG. 1 by the numeral 38.

For a more complete explanation of the in-phase current sensing apparatus just described, attention is directed to copending patent application Serial No. 147,771, entitled "Adjustable Speed Polyphase A-C Motor Drive Utilizing An In-Phase Current Signal For Motor Control", filed on May 28, 1971, in the names of Carlton E. Graf, Einar A. Skogsholm and Werner K. Volkmann and assigned to the assignee of this invention. Again, while the in-phase current signal is a preferred indicator of the starting of one or more motors in the motor bank and which a number of motors are already operating, it should be noted that other parameters which change substantially during motor starting may be monitored and represented by the magnitude of the signal on conductor 38.

Referring again to FIG. 1, the control signal 38 is supplied to a change sensor 100 which produces an output signal 102 only when the control signal 38 increases substantially from its steady state level. In other words, an output signal 102 is produced only when there is a change in the in-phase current output on conductors 14 that is consistent with the starting of one of the motors M1-M8. Signal 102 is supplied to a voltage adjusting signal generator 104. In response to an output signal 102, the voltage adjusting signal generator 104 produces the voltage increasing signal 28. As explained previously, the voltage increasing signal 28 is produced for a period of time sufficient to bring a motor being started up to its synchronous speed. The signal 28 is then automatically removed, and the output voltage of the inverter 10 drops to a steady state level sufficient for motor operation.

Figure 3:
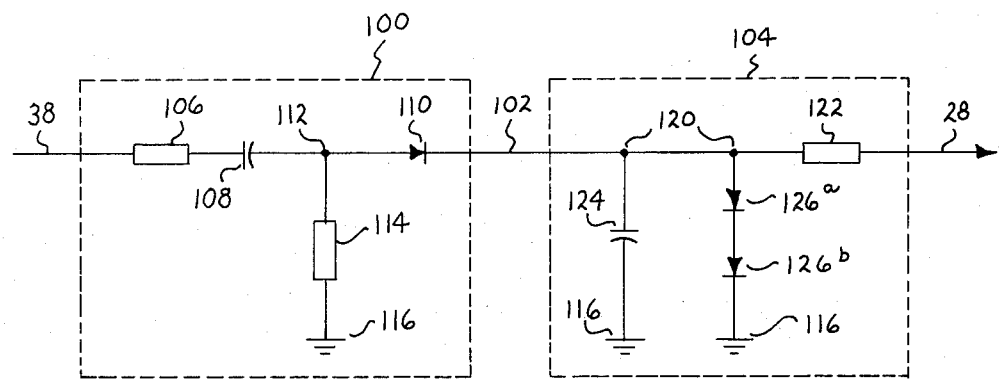
FIG. 3 is a circuit diagram of the change sensor and of one embodiment of the voltage adjusting signal generator of FIG. 1.

FIG. 3 illustrates a preferred embodiment of the change sensor 100 and one embodiment of the voltage adjusting signal generator 104. The change sensor 100 includes an input resistor 106, a capacitor 108, and a diode 110 connected in series between conductor 38 and conductor 102, the cathode of the diode 110 being connected to the conductor 102 and the anode of the diode 110 being connected to junction 112 and the capacitor 108. A resistor 114 is connected between common 116 and the junction 112 between the capacitor 108 and the diode 110.

If a number of the motors M1-M8 are operating under steady state conditions, the control signal 38 will have a steady state level proportional to the in-phase components of current supplied to the motors. Under these conditions, the capacitor 108 and the discharge resistor 114 maintain the junction 112 at the potential of common 116, and no output signal is supplied to conductor 102. If the control signal 38 should rise slightly, a corresponding increase will appear transiently at junction 112, but not on conductor 102 since the voltage drop on the diode 110 will be insufficient to cause conduction. Similarly, a substantial reduction in the control signal 38 will not be transmitted through the diode 110 due to the polarity of the diode. However, a substantial increase in the control signal 38 resulting from the starting of an additional motor will result in a corresponding transient rise in the voltage at junction 112 and the transmission of a charge signal 102 to the voltage adjusting signal generator 104.

Still referring to FIG. 3, the voltage adjusting signal generator 104 includes an input junction 120 coupled to receive the signal 102 and an output resistor 122 coupled between the junction 120 and conductor for voltage signal 28. A capacitor 124 is connected between the junction 120 and common 116, and a pair of diodes 126a and 126b are connected in series between the junction 120 and common 116. The operation of the voltage adjusting signal generator 104 will now be described. When a change signal is supplied to conductor 102 and input junction 120, the input signal is transmitted through the resistor 122 as a voltage increasing signal 28 to the regulator 20 to increase the inverter output voltage, the diodes 126a and 126b limiting the magnitude of the signal 28 to an acceptable level. During the presence of the signal on conductor 102, the capacitor 124 is charged to a voltage greater than that of common 116. Following the removal of the signal 102 from the change sensor 100, the capacitor 124 discharges through the resistor 122 to continue to supply a voltage increasing signal over conductor 28 for a period of time sufficient to assure synchronization of the motor being started. Once the capacitor 124 is discharged, the signal 28 disappears, and the output voltage of the inverter will return to its lower steady state level. Through proper selection of the resistor 122 and the capacitor 124, the duration of the voltage boost can be controlled. In one application where the in-phase current signal on conductor 38 ranged from a typical steady state range of 1 volt to 5 volts to a starting current level in the range of 3 volts to 7 volts, it was found that a voltage boost signal 28 of approximately 0.05 milliamps was required for approximately 2 seconds. This was accomplished by selecting the circuit components as follows: resistor 106 — 1,000 ohms; capacitor 108 — 100 microfarads; resistor 114 — 25,000 ohms; resistor 122 — 10,000 ohms; and capacitor 124 — 200 microfarads. To accomplish voltage boost signals of different magnitudes and durations, appropriate changes in the characteristics of the circuit components can be made.

Figure 4:
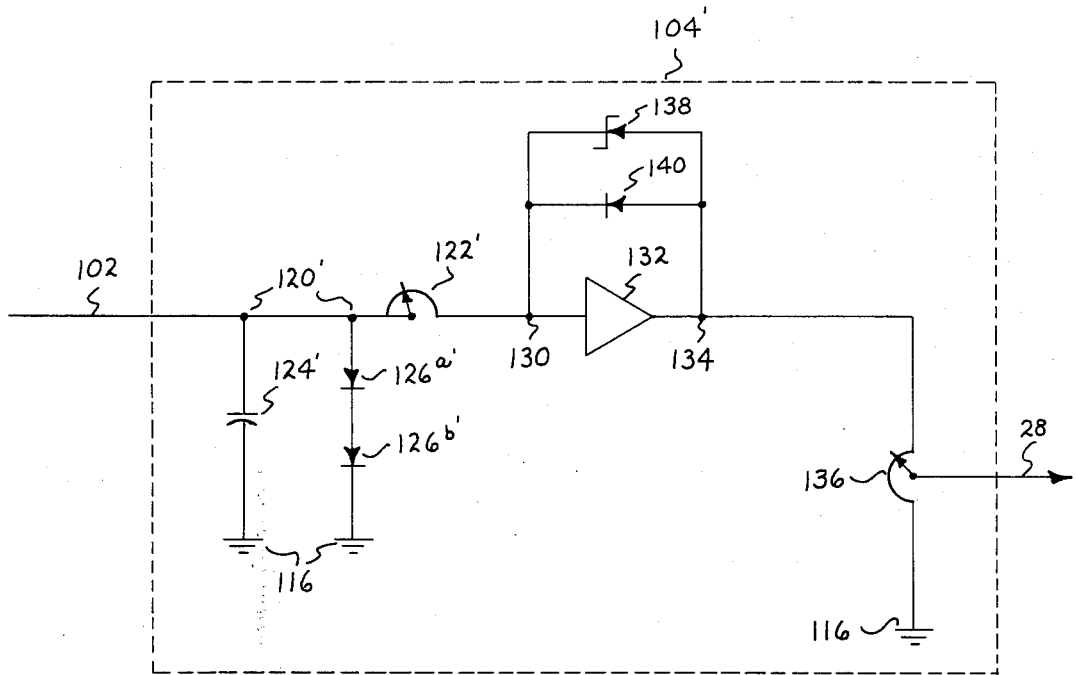
FIG. 4 is a circuit diagram of a second embodiment of the voltage adjusting signal generator.

Referring now to FIG. 4, a second embodiment 104' of the voltage adjusting signal generator is illustrated, the generator 104' including an input junction 120' coupled to the conductor 102 and to a variable resistor 122' connected between the junction 120' and a junction 130. The junction 120' is also coupled to common 116 through a capacitor 124' and a pair of series connected diodes 126a and 126b. These elements function in a manner identical to the elements with corresponding unprimed numerals in FIG. 3, the adjustability of the resistor 122' making it possible to selectively adjust the length of the voltage adjusting signal supplied to conductor 28. In order to assure that the voltage adjusting signal 28 has a substantially constant magnitude throughout the boost period, an operational amplifier 132 having infinite gain is coupled to junction 130, the output junction 134 of the amplifier 132 being connected through a potentiometer 136 to common 116. A clamp circuit comprising a 10 volt zener 138 and a diode 140 in parallel are connected across the junctions 130 and 134 so as to maintain a substantially constant output signal at output junction 134 so long as the input signal at input junction 130 has any significant level, i.e., throughout the boost level selected by the setting of the resistor 122'. The actual magnitude of the signal on conductor 28 may be adjusted at any desired level through appropriate adjustment of the slider arm of the potentiometer 136.

From the foregoing, it will be seen that this invention provides improved means for assuring rapid and reliable starting of synchronous motors in drive systems in which the motors being started and a number of previously synchronized motors are connected to a single source of adjustable voltage electric power. Furthermore, the rapid and reliable starting is accomplished in accordance with the invention without changing the operating speeds of the previously synchronized motors, without causing excessive heating due to operation at excessive voltage levels, and without requiring the use of expensive and complex control circuitry.

While the invention has been particularly shown and described with reference to preferred embodiments thereof, it will be understood by those skilled in the art that various changes in form, details, and application may be made therein without departing from the spirit and scope of the invention. Although the invention has been illustrated in a polyphase drive system, it is equally applicable to single phase systems. Similarly, it will be obvious that the invention is applicable to adjustable voltage drive systems utilizing a-c power sources other than inverters. Accordingly, it is intended that all such modifications and changes be included within the scope of the appended claims.

What is claimed as new and is desired to secure by Letters Patent of the United States is:

1. In an a-c drive system including a source of adjustable voltage a-c electric power and a plurality of synchronous motors coupled to the source for receiving electric power therefrom, control means comprising:

first means coupled to the source for sensing a selected output parameter thereof having a magnitude which varies substantially from its steady state level during the starting of one or more of the motors and for producing a first control signal having a magnitude representative of the magnitude of the selected output parameter, second means coupled to said first means for receiving first control signals therefrom and producing in response to a substantial change in a first control signal a second control signal, third means coupled to said second means for receiving second control signals therefrom and producing in response to a second control signal a third control signal having a predetermined duration following the initial reception of the second control signal, and fourth means coupled to the source for controlling the output voltage of the electric power supplied therefrom, said fourth means also coupled to said third means for receiving third control signals therefrom and responding to a third control signal by changing the voltage of the electric power supplied by the source throughout the predetermined duration of the third control signal.

2. Control means as defined by claim 1 in which the selected output parameter sensed by said first means is the component of output current that is in phase with the output voltage of the source.

3. Control means as defined by claim 1 in which the magnitude of third control signals produced by said third means is independent of the respective magnitudes of the changes in the first control signal.

4. Control means as defined by claim 1 in which the selected output parameter sensed by said first means increases during the starting of one or more of the motors, in which said second means comprises means for producing second control signals in response to substantial increases or decreases in the selected output parameter as represented by respective increases or decreases of first control signals, in which said means comprises means for generating third control signals only in response to second control signals produced in response to increases in first control signals, and in which said fourth means increases the output voltage of the source throughout the predetermined duration of third control signals, whereby the output voltage of the source is automatically increased during the starting of one or more motors so as to implement rapid synchronization of the motors being started without changing the operating speed of previously synchronized motors.

5. Control means as defined by claim 4 in which the selected output parameter sensed by said first means is the component of output current that is in phase with the output voltage of the source.

6. Control means as defined by claim 4 in which said second means includes means for producing second control signals of different polarity in response to, respectively, increases and decreases in the first control signal, and in which said third means includes unidirectional input means selected so as to transmit only second control signals produced in response to increases in the first control signal.

7. Control means as defined by claim 6 in which the magnitude of third control signals produced by said third means is independent of the magnitude of second control signals transmitted by said unidirectional input means.

8. Control means as defined by claim 7 in which said third means further comprises means for maintaining the magnitude of third control signals substantially constant throughout the predetermined duration.

9. Control means as defined by claim 7 in which said third means further comprises means for adjusting the predetermined duration of third control signals and means for adjusting the magnitude of third control signals.

10. Control means as defined by claim 9 in which said third means further comprises means for maintaining the magnitude of third control signals substantially constant throughout the predetermined duration.

11. An adjustable speed drive system comprising:

an inverter for supplying adjustable frequency, adjustable voltage electric power, a plurality of synchronous motors coupled to said inverter for receiving electric power therefrom, means for independently starting and stopping said motors, first means coupled to said inverter for sensing a selected output parameter thereof which increases substantially from its steady state level during the starting of one or more of the motors and for producing a first control signal having a magnitude representative of the magnitude of the selected output parameter, second means coupled to said first means for receiving first control signals therefrom and producing in response to a substantial change in a first control signal a second control signal, third means coupled to said second means for receiving second control signals therefrom and producing in response to a second control signal responsive to an increase in a first control signal a third control signal having a predetermined duration following the initial reception of the second control signal, and fourth means coupled to said inverter forcontrolling the output frequency and the output voltage of the electric power supplied therefrom, said fourth means also coupled to said third means for receiving third control signals therefrom and responding to a third control signal by increasing the output voltage of said inverter throughout the predetermined duration of the third control signal, whereby the output voltage of said inverter is automatically increased during the starting of one or more motors so as to implement rapid synchronization of the motors being started without changing the operating speed of previously synchronized motors.

12. Control means as defined by claim 11 in which said second means includes means for producing second control signals of different polarity in response to, respectively, increases and decreases in the first control signal and in which said third means includes unidirectional input means selected so as to transmit only second control signals produced in response to increases in the first control signal.

13. Control means as defined by claim 12 in which the magnitude of third control signals produced by said third means is independent of the magnitude of second control signals transmitted by said unidirectional input means.

14. Control means as defined by claim 13 in which said third means further comprises means for maintaining the magnitude of third control signals substantially constant throughout the predetermined duration.

15. Control means as defined by claim 14 in which said third means further comprises means for adjusting the predetermined duration of third control signals and means for adjusting the magnitude of third control signals.

16. Control means as defined by claim 15 in which the selected output parameter sensed by said first means is the component of output current that is in phase with the output voltage of said inverter.

17. A method of providing rapid synchronization of one or more synchronous motors being started in a system in which a source of adjustable frequency, adjustable voltage electric power supplies electric power to the motors being started and to a plurality of previously operating motors, said method comprising:
sensing a selected output parameter of the source which changes substantially from its steady state level during the starting of one or more motors,
and increasing the output voltage only of the source for a predetermined period following the sensing of a change in the selected output parameter which is consistent with the starting of one or more motors,
whereby the increased output voltage implements rapid synchronization of the motors being started without changing the operating speed of the previously operating motors.

* * * * *